Figure 1:
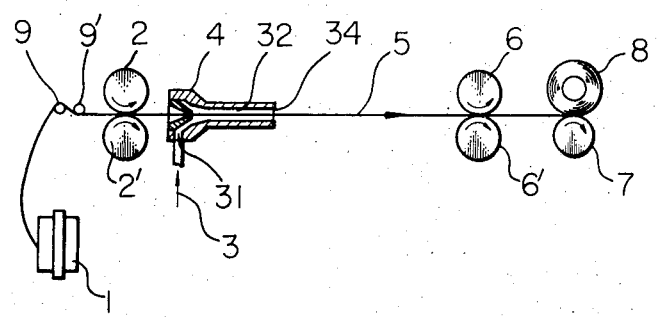

United States Patent
Kosaka et al.

[15] 3,702,055
[45] Nov. 7, 1972

[54] METHOD FOR MANUFACTURING FALSE TWISTED THREADS FROM THERMOPLASTIC RESIN TAPES

[72] Inventors: Kenzo Kosaka; Masami Tsunewaki; Hideo Tanaka, all of Nagoya-shi; Akira Aoki, Inazawa-shi, all of Japan

[73] Assignee: Mitsubishi Rayon Company Limited, Tokyo, Japan

[22] Filed: Aug. 4, 1969

[21] Appl. No.: 847,132

[30] Foreign Application Priority Data

Aug. 14, 1968 Japan ..................... 43/57477

[52] U.S. Cl. .......... 57/157 TS, 28/DIG. 1, 28/72.12, 57/34 HS, 57/157 F, 57/167
[51] Int. Cl. ........................... D02g 1/02, D02g 1/16
[58] Field of Search ..... 57/31, 34, 34 HS, 34 B, 77.3, 57/140, 140 I, 155, 157 TS, 157 F, 157; 28/72, 72.12, 1.4, 1 F, 1 B

[56] References Cited

UNITED STATES PATENTS

| | | | |
|---|---|---|---|
| 2,900,782 | 8/1959 | Bobkowicz | 57/155 X |
| 3,206,922 | 9/1965 | Nakahara et al. | 57/77.3 |
| 3,279,164 | 10/1966 | Breen et al. | 57/157 |
| 3,303,639 | 2/1967 | Carter et al. | 57/77.3 |
| 3,371,477 | 3/1968 | Felix | 57/157 F |
| 3,378,997 | 4/1968 | Matsui et al. | 57/34 |
| 3,398,220 | 8/1968 | Port et al. | 57/167 X |
| 3,398,441 | 8/1968 | Adachi et al. | 28/72 |
| 3,422,616 | 1/1969 | Felix | 57/157 |
| 3,444,683 | 5/1969 | Hessenbruch | 57/157 |
| 3,470,685 | 10/1969 | Hall et al. | 57/140 |
| 3,473,206 | 10/1969 | Boultinghouse | 28/72 |
| 3,474,611 | 10/1969 | Suzuki et al. | 57/31 |
| 3,488,941 | 1/1970 | Asaka | 57/157 |

Primary Examiner—John Petrakes
Attorney—Robert E. Burns and Emmanuel J. Lobato

[57] ABSTRACT

A method for manufacturing false twisted thermoplastic thread from thermoplastic resin tape comprises passing the tape through a region wherein an eddy stream of a high temperature high pressure fluid such as steam, superheated steam and air is present. The eddy stream is produced by eccentrically jetting a high pressure fluid of a temperature not lower than the plasticizing point having the thermoplastic resin tape into a cylindrical thread forming tube. The thermoplastic resin tape is false twisted so as to form a cylindrical bundled thread and simultaneously thermoset in the bundled form all by the effect of the eddy stream.

25 Claims, 17 Drawing Figures

METHOD FOR MANUFACTURING FALSE TWISTED THREADS FROM THERMOPLASTIC RESIN TAPES

The present invention relates to a method for manufacturing false twisted threads from thermoplastic resin tapes, and more particularly relates to a method for manufacturing false twisted threads which are thermoset by an eddy stream of a high pressure fluid of a temperature not lower than the plasticizing point of the thermoplastic resin tapes.

A split fibrous bundle, so-called split yarn, is well-known as a yarn-like thread manufactured previously from synthetic resin film. The conventional split yarn is manufactured in the following steps:

1. applying the synthetic resin tape to a high degree orientation in such a manner as drawing in order to make it easily splittable, and
2. finely splitting the synthetic resin tape in a longitudinal direction by conventional chemical, physical or mechanical means.

Numerous proposals have been made in regard to the conventional splitting manner. However, any fibrous bundled thread manufactured by the conventional manners are unsuitable for textile processing use, owing to the accompanying disadvantages as stated below:

1. undesirable thin and flat form, that is, unsatisfactory low bulkiness,
2. easily producing of undesirable fluffs and disheveled fibers owing to a fact that the split fibers in the bundle are not bound to each other,
3. high frictional resistance in processing particularly, in a weaving or knitting process in which the fibrous bundle is frictionally contacted with guides or other parts of a weaving machine or knitting machine,
4. resulting of so-called paper-like fabrics which have unsatisfactory low bulkiness, and
5. high thermal shrinkage.

In order to improve the processability and product performance of such a split fibrous bundle, a twisted thread was manufactured by a process of twisting the split fibrous bundle. However, such a twisting process is economically undesirable owing to low efficiency and expensive processing costs. The product manufactured from the twisted split fibrous bundle was less bulky than that from a non-twisted split fibrous bundle. Furthermore, when the products from the conventional split fibrous bundle were subjected to a thermal treatment at high temperature, the products resulted in large dimensional deformation and flattening owing to high thermal shrinkage thereof.

An object of the present invention is to provide a novel method for manufacturing highly efficient false twisted thread which has high processability for textile processing, such as weaving and knitting from a thermoplastic resin tape by a very simple process.

Another object of the present invention is to provide a novel method for manufacturing a false twisted thread having low thermal shrinkage from a thermoplastic resin tape.

It has now been found that a false twisted thread can be manufactured by the method according to the present invention comprising the following steps:

a. feeding a thermoplastic resin tape into a cylindrical thread forming means, b. eccentrically jetting a high pressure fluid of a temperature not lower than the plasticizing point of the thermoplastic resin tape into the thread forming means, by which can be produced an eddy stream of the fluid within the thread forming means, c. bundling the fed tape to a cylindrical thread form by a false twisting action of the eddy stream, d. simultaneously thermosetting the bundled tape at the cylindrical thread form by a heating effect of the jetted fluid, and e. delivering the resultant thread from the thread forming means.

The method of the present invention and the false twisted thread manufactured by the method have the advantages as follows:

1. the apparatus for this method is very simple in its construction,
2. the processing can be carried out at a high velocity, that is, several thousands meters/minute, these advantages (1) and (2) are based on the fact that the desired spun yarn-like thread is obtained by passing the thermoplastic resin tape through the eddy stream region of the high pressure fluid only,
3. the spun yarn-like thread has no fluffs and disheveled fibers and is bundled in a cylindrical form, and
4. the spun yarn-like thread is low-thermal shrinkable.

Owing to the above-mentioned advantages, the false twisted thread manufactured by the method of the present invention can be easily applied to the textile processing such as weaving and knitting and performances such as bulkiness, handling and appearance of the fabrics obtained from the false twisted thread resemble those of the conventional fabrics such as jute, ramie and linen fabrics. Therefore, the thread manufactured by the method of the present invention is sufficiently usable for clothing, to which the conventional split yarn could not be applied, not to mention industrial use such as backing cloth for carpet, cord, rope, twine, net, fishing net, and wall cloth.

The tape suitable for the method of the present invention may be manufactured from any thermoplastic synthetic resin which is capable of being formed into film form. The thermoplastic synthetic resins can be used, for example, polyolefine such as polyethylene and polypropylene. Polyvinyl chloride, polyacrylonitrile, polyamide such as nylon 6, polyester and polyvinyl alcohol are also suitable to this purpose. Preferably, polyethylene tape, polypropylene tape, and polyethylene-polypropylene blended resin tape, particularly, polyethylene (5 to 40 percent by weight)-polypropylene (60 to 95 percent by weight) blended resin tape are very suitable for the purpose of the present invention.

It is allowable to blend coloring matter such as pigment into the thermoplastic resin to obtain colored tape.

Further, an additional agent such as a foaming agent may be blended with the thermoplastic resin in order to obtain an easily splittable tape. Furthermore, adhesives and plasticizers may be blended with the thermoplastic resin in order to obtain special tape.

The tape usable for the method of the present invention is prepared from the thermoplastic resin mentioned above by the conventional T-die method or inflation method. The tape may be prepared by cutting off a film manufactured by the conventional T-die method or inflation method into desired dimensions. The tape also may be prepared from an irregular film having an irregular cross-sectional profile such as wavy curled film or a composite film in which at least two different film layers are bound.

Further advantages and features of the present invention will be seen from the following description referring to embodiments shown in the drawings.

Figure 2:
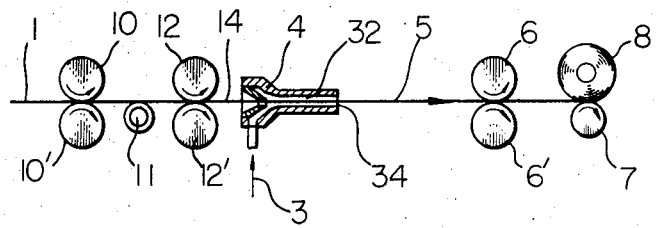
Figure 3:
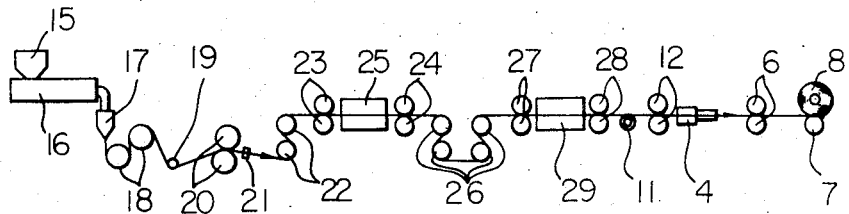
Figure 4:
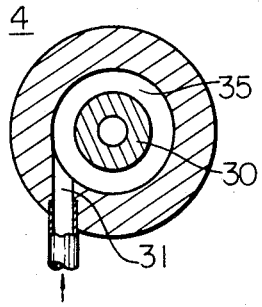
Figure 5:
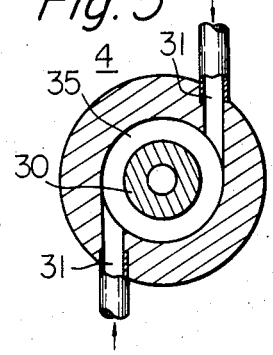
Figure 6:
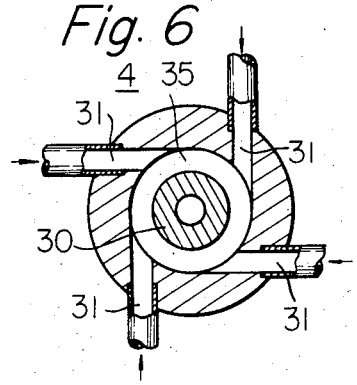
Figure 7:
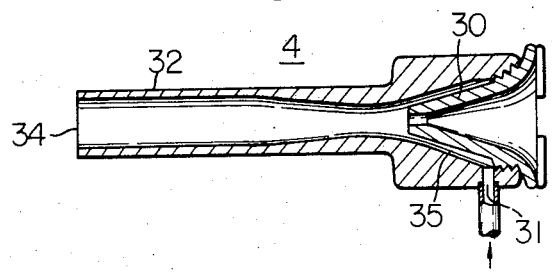
Figure 8:
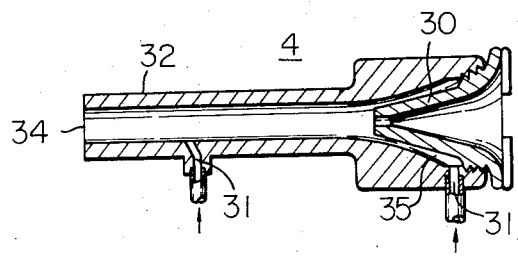
Figure 9:
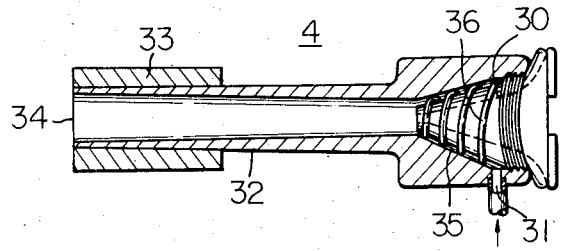

In the drawings,

FIG. 1 is a schematic view of an embodiment of an apparatus for carrying out the method of the present invention, FIG. 2 is a schematic view of another embodiment of an apparatus containing a splitting device for carrying out the method of the present invention, FIG. 3 is a schematic view of an embodiment of an apparatus connected to a synthetic tape manufacturing apparatus for carrying out the method of the present invention, FIGS. 4, 5 and 6 are front cross-sectional views of embodiments of a nozzle device of the present invention, respectively, FIGS. 7, 8 and 9 are side cross-sectional views of embodiments of a nozzle device of the present invention, respectively, FIGS. 10A, 11A, 12A and 13A are cross-sectional views of embodiments of thread prepared by the method of the present invention, respectively, and FIGS. 10B, 11B, 12B and 13B are side views of the threads of FIGS. 10A to 13A, respectively.

In FIG. 1, the tape 1 which is a starting material for the thread of the present invention is fed into a converting means comprising the nozzle device 4 by way of a pair of feed rollers 2 and 2' through the guide rollers 9 and 9' at a specified velocity. The high temperature high pressure fluid 3 is eccentrically fed into the nozzle device 4 through the fluid feeding conduit 31 in order to form an eddy stream region within the thread forming tube 32. The tape 1 introduced into the thread forming tube 32 is false twisted and then bundled into a cylindrical thread form by the action of the eddy stream of the fluid and simultaneously heat-set in this form by the heat of the fluid.

The tape 1 which is formed into the false twisted thread 5 in the thread forming tube 32 is discharged from the discharge outlet 34 by way of a pair of delivering rollers 6 and 6' together with the fluid and taken up into a cheese or cone 8 by the winding roller 7.

The starting tape 1 which has a high latent thermal shrinkage due to previous drawing is relaxed in the nozzle device 4 by the action of the high temperature high pressure eddy stream of the fluid. The thermal shrinkage of the obtained thread therefore, is very small.

If the starting tape having a high degree of orientation is applied to the method of the present invention, the starting tape can be split into fibrous form in the longitudinal direction by the action of the high temperature, high pressure eddy stream of the fluid so as to form a split fibrous bundle.

Further, a previously split starting tape may be used. FIG. 2 shows an embodiment of a thread manufacturing system from the split tape. The starting tape 1, which is fed from a tape manufacturing process, is split into a fine fibrous form by way of the splitting cutter 11 between a pair of feed rollers 10 and 10' and a pair of intermediate rollers 12 and 12'.

This previous splitting process may be carried out by way of the conventional splitting method and machine as follows:

1. the mechanical splitting by way of (a) the roller cutter, which has a plurality of knife edges on the peripheral surface thereof and (b) the rotating pins and 2. physical splitting by utilization of (a) frictional action, (b) stretching action, (c) beating action and jetting force of fluid.

The split tape 14 thus obtained is fed into the nozzle device 4 and converted to false twisted thread by the same action as described above.

The splittable film may be manufactured by highly mono-axis drawing of the thermoplastic resin film in the longitudinal direction, by which the orientation degree of the film may be improved.

In FIG. 3, a process in which the manufacturing process of the false twisted thread of the present invention continuously follows the manufacturing process of the starting tape is explained.

The thermoplastic resin is charged from the hopper 15 into the extruder 16, melted therewithin, extruded in a sheet form through the die 17. The extruded resin is coagulated into a film form on the cooling roller 18. Successively, the film is delivered by the roller 20 from the cooling roller 18 through the guide roller 19 and fed to the film slitter 21 disposed between the delivering rollers 20 and the snap rollers 22. The fed film is slit by the film slitter 21 in a tape form. The slit tape is drawn in the longitudinal direction between the first feeding rollers 23 and the first delivery rollers 24 while the tape is heated in the first heating device 25 disposed between these rollers.

The drawn tape is fed into the second heating device 29 through the snap rollers 26 and the second feed rollers 27 in order to subject the tape to a heat treatment at a fixed length of the tape.

The heat treated tape is delivered from the heating device 29 by the delivery rollers 28. If necessary, the tape is slit by the splitting roller 11, the tape or the split tape is fed into the nozzle device 4 through the third feeding rollers 12 and converted into a false twisted thread in the same manner as FIG. 1.

The nozzle device or converting means 4 will be explained in detail hereinafter. Any nozzle device as shown in FIGS. 4 to 9 is provided with a cylindrical thread forming tube 32, a funnel-shaped surface or tape passage 30, a fluid passage 35 formed in the form of an annular space between the outside surface of the tape passage and the inside surface of the thread forming tube 32 and at least a fluid conduit 31. FIG. 4 shows an embodiment of the nozzle device having only one fluid conduit 31. FIGS. 5 and 6 show embodiments of the nozzle devices having two and four fluid conduits, respectively. Every fluid conduit 31 is arranged in an eccentric tangential position with respect to the fluid passage 35. The fluid is eccentrically jetted into the fluid passage 35 through the fluid conduit 31 to form a fluid vortex and further jetted into the thread forming tube 32 under a high pressure jetted condition. The high pressure fluid thus produces an eddy stream or vortex stream in which the fluid is spiraling within the thread forming tube. In FIG. 7, only a fluid conduit 31 is connected fluidly to the fluid passage 35. In FIG. 8, two fluid conduits 31 and 31' are connected fluidly to the fluid passage 35 in a manner as shown in the drawing. The high temperature high pressure fluid may be jetted into the thread forming tube 32 through both fluid conduits 31 and 31', but in another case, the high temperature high pressure fluid may be jetted through any one of the fluid conduits 31 and 31' and a room temperature fluid is jetted through another conduit. In case two or more nozzle devices are arranged in series, the high temperature high pressure fluid must be jetted into at least one of the nozzle devices in order to achieve the purpose of the present invention.

The nozzle device 4 shown in FIG. 9 is provided with two improvements. That is, the supplementary heater 33 is disposed on the peripheral outside surface of the thread forming tube 32 in order to reinforce the heating effect of the fluid, further, the spiral fluid passage 36 is formed in the space 35 connecting the fluid conduit 31 to the thread forming tube 32 in order to reinforce the eddy's stream formation of the fluid. The fluid jetted through the fluid conduit 31 produces a reinforced eddy stream during passing through the spiral fluid passage 36. The tape fed through the tape passage 30, therefore is converted into a desirable thread form due to the action of the reinforced eddy stream of the fluid and effect of the reinforced heating. Ratio of feeding velocity of the starting tape with respect to delivering velocity of the resultant thread is important data for the method in accordance with the present invention. Namely, in FIGS. 1 and 2, the ratio of peripheral velocity of the feeding rollers 2 and 2' with respect to peripheral velocity of the delivering rollers 6 and 6' closely relates to the configuration of the resultant thread. The velocity ratio must be suitably specified according to the kind of starting tape, treating velocity of the tape, kind of fluid to be jetted, and temperature thereof. Usually, the delivering velocity of the resultant thread may be adjusted in a range of 80 to 110 percent, preferably 90 to 100 percent of the feeding velocity of the starting tape. That is, it is preferable that the feeding velocity of the starting tape exceed the delivering velocity of the resultant thread in a range of 0 to 10 percent. Because, the starting tape shrinks in the nozzle device by the heating effect of the fluid owing to its high thermal shrinking property which is caused by the drawing process in the tape manufacturing. The high thermal shrinkage of the starting tape is effective for forming the cylindrical tape bundle. The resultant thread, which has a low thermal shrinkage owing to the thermal shrinking in the thread forming process, is not required to have any heat treatment process, which is required for the conventional split yarn. Further, the above-mentioned overfeed of the starting tape is effective for promoting the false twisting effect of the fed tape by ensuing the splitting effect the fluid. In the special case, the resultant thread is delivered from the nozzle device, being stretched at a delivering velocity higher than the feeding velocity, the resultant thread is compactly bundled in a cylindrical form and, thus, has a stable structure by allowing the temperature of the fluid to rise close to the melting point of the starting tape.

In the method of the present invention, it is an important requirement that the temperature of the jetted fluid is higher than the plasticizing point of the starting tape. The temperature of the jetted fluid means a temperature of the fluid just after being jetted into the nozzle device.

Such a treatment method and apparatus of the starting tape with the eddy stream of high temperature fluid is a novel manner which can not be found in the conventional film yarn manufacturing. Air, steam or superheated steam, which have been heated to a plasticizing temperature or higher of the starting tape, may be used as the jetting fluid. Furthermore, plasticizers, solvents, swelling agents or adhesives for the starting tape may be mixed into the jetting fluid. The temperature and pressure of the jetting fluid may be selected appropriately in accordance with the kind of starting tape, treating velocity and object of manufacture. For example, in case polyolefine resin tape is used for the method, it is desirable to treat the polyolefine resin tape with superheated steam at a high treating velocity of 100 to 2,000 m/min. Pressure of the jetted fluid may be selected from a range between 0.5 to 10 kg/cm$^2$, but the range of 2–4 kg/cm$^2$ is particularly preferable.

The thread, just after treatment by the high temperature eddy stream of fluid, has a considerably high temperature. Thus, the high temperature thread can be modified easily to a thread of which the outside surface is uniformly fused by passing the thread through a die heated to a thread melting point or higher, or to a thread of which the outside surface has various rugged patterns by passing the thread through a pair of high temperature embossing rollers.

Figure 10A:
Figure 10B:
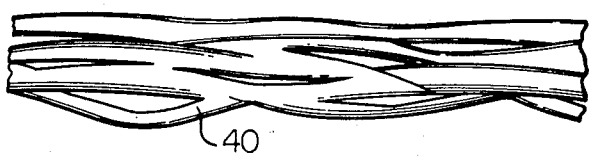

The spun yarn-like thread manufactured by the method of the present invention may be provided with various forms, configurations and characteristics. Some examples of the thread are shown in FIGS. 10A to 13B. The thread, as shown in FIGS. 10A and 10B is manufactured in a condition in which a temperature of the jetted fluid is relatively low and an overfeed percentage for the starting tape is approximately 5 percent. The thread by the false twisting action of the jetted fluid in the nozzle device, is more stable for thermal shrinking and deforming than the conventional split yarn.

Figure 11A:
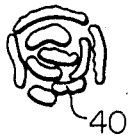
Figure 11B:
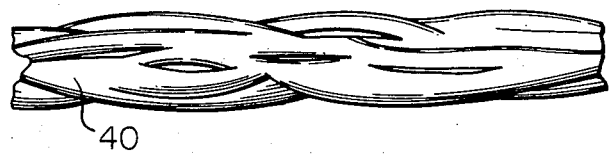

The thread, as shown in FIGS. 11A AND 11B, is manufactured in a condition which a jetted fluid temperature is higher than that of FIGS. 10A and 10B. This thread is more bulky than the thread of FIGS. 10A and 10B. The split fibers 40 in the thread of FIGS. 11A and 11B are cylindrically bundled in a partially entangled condition with adjacent fibers by action of the eddy stream of fluid and deformed into an uneven shape by the effect of high temperature fluid in order to impart bulkiness. Furthermore, since all fibers in the thread are thermally treated by the high temperature fluid so that each split fiber positioned at an outside surface part of the thread is partially fused and bound with adjacent fibers, the structure of the resultant thread is very stable, and thus, the resultant thread can be satisfactorily processed for weaving and knitting, the same as or more easily than that of the conventional twisted spun yarn. Density of the split fibers in a cross-section in the resultant thread is considerably higher than that of the conventional split yarn and it is easy to make the density resemble conventional spun yarn.

The knitted or woven fabrics manufactured from the spun yarnlike thread has a desirable handling closely resembling that of the conventional spun yarn fabric.

Figure 12A:

The thread, as shown in FIGS. 12A and 12B, is manufactured in a condition where a percentage of the overfeed is 1 to 2 percent. This thread has a similar performance as the conventional hard twisted yarn, with the exception of relatively low bulkiness due to a densely packed structure.

Figure 13A:
Figure 13B:
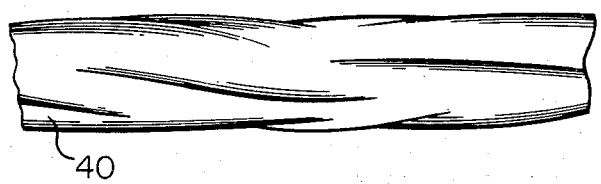

The thread, as shown in FIGS. 13A and 13B, is manufactured under a condition where the temperature of the jetted fluid is higher than that of FIGS. 12A and 12B and the delivering velocity of the resultant thread is 0 to 5 percent higher than the feeding velocity of the starting tape in order to stretch the starting tape. In this case, the resultant thread is bundled tightly into a cylindrical form but the surface and the contacting parts of the tape are fused and bound into a wire-form. Thus, the structure of the resultant thread is very stable.

The spun yarn-like threads manufactured by the method of the present invention can be satisfactorily utilized as weaving or knitting yarn for general purposes. Particularly, in case high strength thread is required, for example, in the field of industrial use, it is capable of reinforcing the strength of the thread by further true twisting and in case very low thermal shrinkage thread is required, it is capable of lowering the thermal shrinkage of the thread by further thermosetting the thread in a fixed length condition at a temperature suitable to the thermal property of synthetic resin which composes the thread.

The starting tape may be used together with one or more of the same or different tape of tapes in a doubled condition.

The following examples illustrate various methods of carrying out the present invention, but it is to be understood that these examples are given by way of illustration and not of limitation.

EXAMPLE 1

Uniaxially drawn polypropylene tape of 1,000 denier fineness, 15.7 microns thickness and 6.5 mm width was treated under the following conditions with the system shown in FIG. 1 to manufacture a spun yarn-like thread.

1. Feeding velocity of tape: 2,000 m/min
2. Delivering velocity of thread: 1,980 m/min
3. Nozzle device:
   A device as shown in FIG. 9 was applied.
   The device contained a fluid conduit.
4. Fluid:
   Superheated steam of a temperature of 300°C and a gauge pressure of 3.0 kg/cm² was used.

The properties of the resultant thread and the starting tape are shown in Table 1.

TABLE 1

| Items | Tenacity (g) | Breaking Elongation (%) | Thermal Shrinkage (%)*1 |
|---|---|---|---|
| Starting tape | 3,430 | 8.48 | 8.05 |
| Resultant thread | 3,700 | 5.71 | 2.48 |

Note: *1 Thermal shrinkage is measured in a manner where the tape or thread is treated by dry air of 120°C for 10 minutes in the free length condition.

Figure 12A:
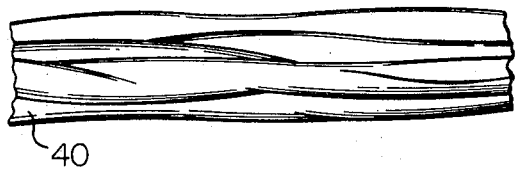

The resultant thread had a similar structure and appearance as indicated in FIG. 12 and its handling resembled that of conventional spun yarn.

The resultant thread could be satisfactorily carried out for weaving without sizing and the handling of the fabric woven from the resultant thread resembled that of linen fabrics. The resultant thread was suitable for manufacturing clothing fabrics, industrial fabrics and handicraft yarn for knitting.

EXAMPLE 2

A polyethylene tape of 1,800 denier fineness and 22 microns average thickness which was manufactured through a uniaxial drawing process and having a corrugated cross-section, was treated in the system as shown in FIG. 1 under the following conditions.

1. Feeding velocity of tape: 2,000 m/min
2. Delivering velocity of thread: 1,900 m/min
3. Nozzle device:
   A device as shown in FIG. 7 was applied.
   The device contained four fluid conduits as shown in FIG. 6.
4. Fluid:
   High temperature air of 200°C temperature and 2.5 kg/cm² gauge pressure was used.

The properties of the resultant thread and the starting tape are shown in table 2.

TABLE 2

| Items | Tenacity (g) | Breaking Elongation (%) | Thermal Shrinkage (%)*2 |
|---|---|---|---|
| Starting tape | 3,395 | 11.58 | 6.3 |
| Resultant thread | 3,386 | 5.80 | 1.6 |

Note: *2 Thermal shrinkage was measured in a manner that the tape or thread is treated in hot water of 100°C for 10 minutes in the free length condition.

The resultant thread had the structure and appearance as indicated in FIG. 11, and was suitable for use as fringes and backing cloth of carpet.

EXAMPLE 3

A composite polypropylene tape of 1,000 denier fineness and 20 microns thickness was prepared from a film manufactured by melt-extruding two mutually adherent polypropylene polymers having different polymerization degree from each other through the same die and had two polypropylene layers arranged face to face along the length of the tape and adhered to each other.

The composite tape was provisionally split into a split fibrous bundle and formed into a thread in the system shown in FIG. 1 under the same conditions as stated in example 1.

The properties of the resultant thread and the starting fibrous bundle are indicated in table 3.

TABLE 3

| | Tenacity (g) | Breaking Elongation (%) | Thermal Shrinkage (%)*3 |
|---|---|---|---|
| Starting fibrous bundle | 2,030 | 5.2 | 9.6 |
| Resultant thread | 3,280 | 6.1 | 2.0 |

Note: *3 Thermal shrinkage was measured in the same manner as stated in Example 1.

The resultant thread had a curled appearance as shown in FIG. 11 due to difference of thermal shrinkages of componental polypropylene layers and handling was similar to conventional spun yarn.

EXAMPLE 4

A foamed polyethylene tape of 3,000 denier fineness and 50 microns thickness prepared from a film manufactured by melt-extruding a mixture of 99.7 parts of polyethylene resin and 0.3 parts of azodicarbonamide as a foaming agent and drawing in the longitudinal direction of the film. The prepared tape was subjected to thread forming of the system of FIG. 2 under the following conditions.

| | | |
|---|---|---|
| 1. | Feeding velocity of tape: | 500 m/min |
| 2. | Peripheral velocity of cutting roller: | 800 m/min |
| 3. | Peripheral velocity of intermediate roller: | 510 m/min |
| 4. | Delivering velocity of thread: | 500 m/min |
| 5. | Nozzle device: A device as shown in FIG. 8 was applied. The device contained five fluid conduits. | |
| 6. | Fluid: Superheated steam of temperature 200°C and gauge pressure 2.0 kg/cm² was used. | |

The properties of the resultant thread and the starting tape were as shown in the following table 4.

TABLE 4

| Item | Tenacity (g) | Breaking Elongation (%) | Thermal Shrinkage (%)*4 |
|---|---|---|---|
| Starting tape | 11,800 | 12.3 | 8.6 |
| Resultant thread | 12,240 | 8.1 | 3.3 |

Note: *4 Thermal shrinkage was measured in the same manner as stated in Example 2.

The resultant thread had a spun yarn-like structure and an appearance as shown in FIG. 12 and was suitable for use as a ground yarn for Wiltoncarpet.

EXAMPLE 5

A colored film was prepared by the manufacturing system as shown in FIG. 3. In the system, 78.5 percent by weight of stereo-specific polypropylene of melt index 5.0, 20 percent by weight of polyethylene of melt index 2.0 and 1.5 percent by weight of yellow pigment DP-6044 (which was obtained from Dainippon Ink Manufacturing, Ltd., Japan) were mixed. The mixture was melt-extruded through a T-shaped die of an extruder which has a melting cylinder of 65 mm inner diameter. The resultant film was of 60 microns thickness. The resultant film was subjected to a cutting off to a width of 20 mm along a longitudinal direction, drawing at a drawing ratio of 8.5 and heat-setting by way of an infrared ray heat-setter in a fixed length in order to prepare a starting tape having a fineness of 1,000 deniers and high orientation.

The starting tape was subjected to the thread forming process under the following condition.

| | | |
|---|---|---|
| 1. | Feeding velocity of tape: | 140 m/min |
| 2. | Delivering velocity of thread: | 134 m/min |
| 3. | Nozzle device: A device as shown in FIG. 7 was applied. The device has a fluid conduit as shown in FIG. 4. | |
| 4. | Fluid: Superheated steam of a temperature of 200°C and a gauge pressure 2.5 kg/cm². | |

The resultant thread was subjected to weaving for a backing cloth for carpet. The workability of the resultant thread for the weaving process was as shown together with three comparisons in the following table. In table 5, the comparison example 1 was related to a conventional jute yarn of 1,000 denier fineness, the comparison example 2 was related to a conventional polypropylene tape yarn of 1,000 denier fineness and the comparison example 3 was related to a polypropylene split yarn of 1,000 denier fineness which was prepared from a tape having a corrugated cross-section by way of the conventional split-yarn manufacturing process.

TABLE 5

| Items | Example 5 | Comparison example 1 | Comparison example 2 | Comparison example 3 |
|---|---|---|---|---|
| Shrinkage at 120°C % | 3.5 | 0.3 | 5.3 | 4.4 |
| Work efficiency in the preparation process for weaving and weaving process for backing cloth*5 | Excellent | Standard | Good | Slightly poor |
| Work efficiency in the tufting process for carpet*5 | Excellent | Standard | Rather poor | Slightly poor |
| Adhesive strength of the resultant backing cloth (g)*6 | 1890 | 4245 | 605 | 663 |
| Fixing force of the resultant backing cloth for pile yarn (g)*7 | 2230 | 2320 | 1490 | 1840 |
| Shrinkage of the resultant backing cloth in curing process*8 | 1.35 | 1.06 | 1.60 | 1.60 |

Note: *5 Work efficiency in the preparation process for weaving, weaving process for backing cloth and tufting process for carpet manufacture was evaluated on the basis of the jute yarn.
*6 Adhesive strength of the resultant backing cloth was measured in that latex of 30% concentration was coated on the surface of a 5 cm × 5 cm test piece of backing cloth, a noncoated test piece was attached onto the coated test piece, the attached pieces were dried in the atmosphere and subjected to heat-treatment at 100°C for 20 minutes in order to firm the adhesion and the force required for feeling the adhered test pieces was measured by way of a Schopper-type tensile strength tester.
*7 Fixing force of the resultant backing cloth for pile yarn of carpet was measured in that a pile yarn was prepared by doubling two finished polypropylene multifilament yarns of 1800 dinier/120 filaments. The pile yarn was subjected to tufting for the resultant backing cloth in order to prepare a carpet, a test piece of 5 cm × 10 cm was obtained from the resultant carpet and latex of 50% concentration was coated on a back surface of the test piece, dried in the atmosphere and heat-treated at 100°C for 20 minutes. The force required for pulling out the pile yarn from the test piece was measured.

*8 Shrinkage of the resultant backing cloth in the curing process was measured in that the backing cloth was heated at 130° C for 15 minutes in a heating oven and allowed to cool to room temperature. The average value of shrinkage in a warp and weft direction of the cured backing cloth was measured.

In table 5, it could be seen that the backing cloth prepared from the thread of the present example 5 had better adhesiveness, fixing force for pile yarn and working efficiency and lower thermal shrinkage than the conventional split yarn and tape yarn. The thread of the present example 5, also had better working efficiencies for a preparing process, weaving process and tufting process than those of the jute yarn.

EXAMPLE 6

An acrylic tape was prepared from acrylonitrile-vinyl acetate (93 : 7 by weight) copolymer resin. The intrinsic viscosity of the copolymer was 1.62 in dimethyl formamide at 25°C. The copolymer was dissolved into dimethyl formamide in a concentration of 23.0 percent by weight. The solution was extruded into a polyethyleneglycol bath of 80°C through a nozzle of 0.05 mm width and 32 mm length in order to coagulate the dissolved copolymer in a film form. The coagulated copolymer film was drawn at a drawing ratio of 5 through a boiling water bath and simultaneously, the solvent was eliminated. Through the processes mentioned above, an acrylic tape of 1,000 denier fineness was obtained.

The acrylic tape was treated by the system shown in FIG. 1 under the following conditions.

| 1. | Feeding velocity of tape: | 200 m/min |
|----|---------------------------|-----------|
| 2. | Delivering velocity of thread: | 180 m/min |
| 3. | Nozzle device: | |
|    | A device as shown in FIG. 7 was applied. | |
|    | The device had a fluid passage. | |
| 4. | Fluid: | |
|    | Superheated steam of 350°C and a gauge pressure of 2 kg/cm² was fed. | |

The resultant thread, which was split into a fibrous bundle and simultaneously thermoset in a cylindrical form, had a tenacity of 1,430 g and a breaking elongation of 130 percent. The thread was suitable as yarn for knitting sweaters.

EXAMPLE 7

Two polypropylene tapes which are the same as that of example 1, were subjected to a thread formation process under the same condition as stated in example 1. The tapes were doubled and fed into the nozzle device. The resultant thread in which the componental two tapes were false twisted and partially melt-bonded with each other so as to form a thread, was further subjected to a heat-setting treatment by passing the thread through a heating air box of 2 m length and 200°C temperature at a velocity of 2,000 m/min.

The final resultant thread was thermally stabilized by the heat-setting treatment and is useful for manufacturing rope, cord, twine and net.

EXAMPLE 8

The false twisted polypropylene thread prepared by the same process as stated in example 1, was further subjected to a high temperature heat treatment by passing the thread through a heating box of 2m length and 300°C temperature at a velocity of 2,000 m/min. The resultant thread, the surface of which was partially molten, has a jute yarn-like appearance and hand feeling and usable for manufacturing rope, cord and fishing net.

What we claim is:

1. A method for manufacturing false twisted thermoplastic resin threads comprising: feeding a thermoplastic resin tape into a cylindrical thread forming means, eccentrically jetting a high pressure fluid having a temperature not lower than the plasticizing temperature of said thermoplastic resin tape into said thread forming means to form an eddy stream of said fluid within said thread forming means effective to false twist and split the fed tape by a twisting action of said eddy stream to convert the resin tape to a cylindrical bundled thread form, simultaneously thermo-setting said cylindrical bundled thread form by the heating effect of said fluid, and delivering said resultant thread from said thread forming means.

2. A method as set forth in claim 1, in which said fluid is air.

3. A method as set forth in claim 2, in which said polyolefine resin tape is a polypropylene tape.

4. A method as set forth in claim 2, in which said polyolefine resin tape is a polyethylene resin tape.

5. A method as set forth in claim 2, in which said polyolefine resin tape is a mixed resin tape consisting of polypropylene resin and polyethylene resin.

6. A method as set forth in claim 5, said mixed resin tape consists of 60 to 95 percent polypropylene resin and 5 to 40 percent polyethylene resin.

7. A method as set forth in claim 1, in which said fluid is steam.

8. A method as set forth in claim 7, in which said steam is superheated steam.

9. A method as set forth in claim 1, in which said thermoplastic resin tape is a polyolefine resin tape.

10. A method as set forth in claim 1, said thermoplastic resin tape is an acrylic resin tape.

11. A method as set forth in claim 1, in which said thermoplastic tape is a highly oriented thermoplastic resin tape.

12. A method as set forth in claim 1, in which a pressure of said fluid is 0.5 to 10 kg/cm².

13. A method as set forth in claim 12, in which said pressure of said fluid is 2 to 4 kg/cm².

14. A method as set forth in claim 1, in which said resultant thread is delivered at a delivering velocity of 80 to 110 percent with respect to a feeding velocity of said thermoplastic resin tape.

15. A method as set forth in claim 14, in which said delivering velocity is 90 to 100 percent of said feeding velocity.

16. A method as set forth in claim 1, further comprising heating said fluid jetted into said thread forming means to a desired temperature.

17. A method as set forth in claim 1, in which at least two thermoplastic resin tapes are fed into said cylindrical thread forming means in a parallel tape form.

18. A method as set forth in claim 1, in which said thermoplastic resin tape which is just manufactured through a tape manufacturing means is successively fed into said cylindrical thread forming means.

19. A method as set forth in claim 1, further comprising thermo-treating said resultant thread at a desired temperature.

20. A method as set forth in claim 19, in which said thermo-treating temperature is at least a melting point of said thermoplastic resin tape.

21. A method for manufacturing resin threads comprising: providing a plasticizable resin tape to be formed into a thread; longitudinally advancing said resin tape through a cylindrical zone; and contacting the advancing resin tape within said cylindrical zone with a fluid vortex having sufficient temperature and pressure to effect splitting and bundling of the resin tape into a cylindrical thread accompanied by heat-setting of the cylindrical thread by the heat energy of the fluid vortex.

22. A method according to claim 21; wherein said contacting step comprises contacting the advancing resin tape at an upstream portion of said cylindrical zone sufficiently remote from the downstream end thereof to ensure that the bundled resin tape is heated enough by the fluid making-up said fluid vortex to effectively heat-set the bundled resin tape in its cylindrical thread configuration.

23. A method according to claim 21; wherein said fluid vortex has a temperature not lower than the plasticizing temperature of said plasticizable resin tape.

24. A method according to claim 21; wherein said fluid vortex has a pressure within the range of from 0.5 to 10 Kg/cm$^2$.

25. A method according to claim 21; wherein said advancing step comprised longitudinally advancing said resin tape through said cylindrical zone from an entrance end thereof to an exit end thereof and wherein the advancing rate of the bundled resin tape at said exit end is 80 to 110% that of the resin tape at said entrance end.

* * * * *